US009465490B2

(12) United States Patent
Hinson

(10) Patent No.: US 9,465,490 B2
(45) Date of Patent: Oct. 11, 2016

(54) CURVED SURFACE SENSOR PATTERN

(71) Applicant: Nigel Hinson, Lymington (GB)

(72) Inventor: Nigel Hinson, Lymington (GB)

(73) Assignee: Atmel Corporation, San Jose, CA (US)

(*) Notice: Subject to any disclaimer, the term of this patent is extended or adjusted under 35 U.S.C. 154(b) by 208 days.

(21) Appl. No.: 14/031,743

(22) Filed: Sep. 19, 2013

(65) Prior Publication Data

US 2015/0077350 A1    Mar. 19, 2015

(51) Int. Cl.
G06F 3/041    (2006.01)
G06F 3/044    (2006.01)

(52) U.S. Cl.
CPC .................................. G06F 3/044 (2013.01)

(58) Field of Classification Search
CPC ........................................ G06F 3/041–3/047
See application file for complete search history.

(56) References Cited

U.S. PATENT DOCUMENTS

| | | | |
|---|---|---|---|
| 7,663,607 B2 | 2/2010 | Hotelling | |
| 7,868,778 B2 | 1/2011 | Kenwright | |
| 7,875,814 B2 | 1/2011 | Chen | |
| 7,920,129 B2 | 4/2011 | Hotelling | |
| 8,004,499 B2 | 8/2011 | Geaghan | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2008/0238706 A1* | 10/2008 | Kenwright | 340/686.6 |
| 2009/0273570 A1 | 11/2009 | Degner | |
| 2009/0314550 A1 | 12/2009 | Layton | |
| 2009/0315854 A1 | 12/2009 | Matsuo | |
| 2010/0020026 A1 | 1/2010 | Benko | |
| 2010/0045632 A1* | 2/2010 | Yilmaz et al. | 345/174 |
| 2010/0144391 A1* | 6/2010 | Chang et al. | 455/566 |
| 2010/0245246 A1 | 9/2010 | Rosenfeld | |

(Continued)

FOREIGN PATENT DOCUMENTS

| | | |
|---|---|---|
| JP | 2006156274 A | 6/2006 |
| JP | 2010267607 A | 11/2010 |
| JP | 2012003779 A | 1/2012 |
| JP | 2012242871 A | 12/2012 |
| WO | WO 2012/129247 A2 | 9/2012 |
| WO | WO 2012/167597 A1 | 12/2012 |

OTHER PUBLICATIONS

U.S. Appl. No. 61/454,936, filed Mar. 21, 2011, Myers.

(Continued)

*Primary Examiner* — Quan-Zhen Wang
*Assistant Examiner* — David Lee
(74) *Attorney, Agent, or Firm* — Baker Botts L.L.P.

(57) ABSTRACT

A touch sensor includes a flexible substrate, a plurality of sense electrodes and a plurality of drive electrodes disposed on the flexible substrate, a plurality of electrode branches, and a central spine. Each of the plurality of sense and drive electrodes includes electrode teeth, and electrode teeth of the sense electrodes are interdigitated with electrode teeth of the drive electrodes. Each particular electrode branch includes a portion of at least one of the drive electrodes and a portion of at least one of the sense electrodes. The central spine includes tracks that are coupled to the sense and drive electrodes. When the touch sensor is not formed into a three-dimensional shape, at least a portion of one of the electrode branches is separated from an adjacent electrode branch by a gap. When the touch sensor is formed into a three-dimensional shape, the gap is substantially eliminated, thereby forming a substantially continuous touch-sensitive surface.

20 Claims, 11 Drawing Sheets
(8 of 11 Drawing Sheet(s) Filed in Color)

(56) References Cited

U.S. PATENT DOCUMENTS

| | | |
|---|---|---|
| 2011/0248954 A1 | 10/2011 | Hamada |
| 2011/0273383 A1 | 11/2011 | Jeon |
| 2011/0298699 A1* | 12/2011 | Goto et al. .................... 345/156 |
| 2012/0032916 A1 | 2/2012 | Enoki |
| 2012/0089348 A1 | 4/2012 | Perlin |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0056243 A1 | 3/2013 | Kim |
| 2013/0076612 A1 | 3/2013 | Myers |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
David Holman, et al., "Tactile Tape: Low-Cost Touch Sensing on Curved Surfaces," http://www.hml.queensu.ca/files/TactileTape%20UIST%202011%20Demo%Demo%20.pdf, ACM 978-1-4503-1014—Jul. 11, 2010, pp. 17-18, Oct. 16-19, 2011.

* cited by examiner

CURVED SURFACE SENSOR PATTERN

TECHNICAL FIELD

This disclosure generally relates to touch sensors.

BACKGROUND

An array of conductive drive and sense electrodes may form a mutual-capacitance touch sensor having one or more capacitive nodes. The mutual-capacitance touch sensor may have either a two-layer configuration or single-layer configuration. In a single-layer configuration, drive and sense electrodes may be disposed in a pattern on one side of a substrate. In such a configuration, a pair of drive and sense electrodes capacitively coupled to each other across a space or dielectric between electrodes may form a capacitive node.

In a single-layer configuration for a self-capacitance implementation, an array of vertical and horizontal conductive electrodes may be disposed in a pattern on one side of the substrate. Each of the conductive electrodes in the array may form a capacitive node, and, when an object touches or comes within proximity of the electrode, a change in self-capacitance may occur at that capacitive node and a controller may measure the change in capacitance as a change in voltage or a change in the amount of charge needed to raise the voltage to some pre-determined amount.

A touch sensor detects the presence and location of a touch or the proximity of an object (such as a user's finger or a stylus) within a touch-sensitive area of the touch sensor overlaid, for example, on a display screen. In a touch-sensitive-display application, the touch sensor enables a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, capacitive touch screens, infrared touch screens, and optical touch screens. Herein, reference to a touch sensor encompasses a touch screen, and vice versa, where appropriate. A capacitive touch screen may include an insulator coated with a substantially transparent conductor in a particular pattern. When an object touches or comes within proximity of the surface of the capacitive touch screen, a change in capacitance occurs within the touch screen at the location of the touch or proximity. A controller processes the change in capacitance to determine the touch position(s) on the touch screen.

BRIEF DESCRIPTION OF THE DRAWINGS

The patent or application file contains at least one drawing executed in color. Copies of this patent or application publication with color drawing(s) will be provided by the Office upon request and payment of the necessary fee.

DESCRIPTION OF EXAMPLE EMBODIMENTS

Figure 1:
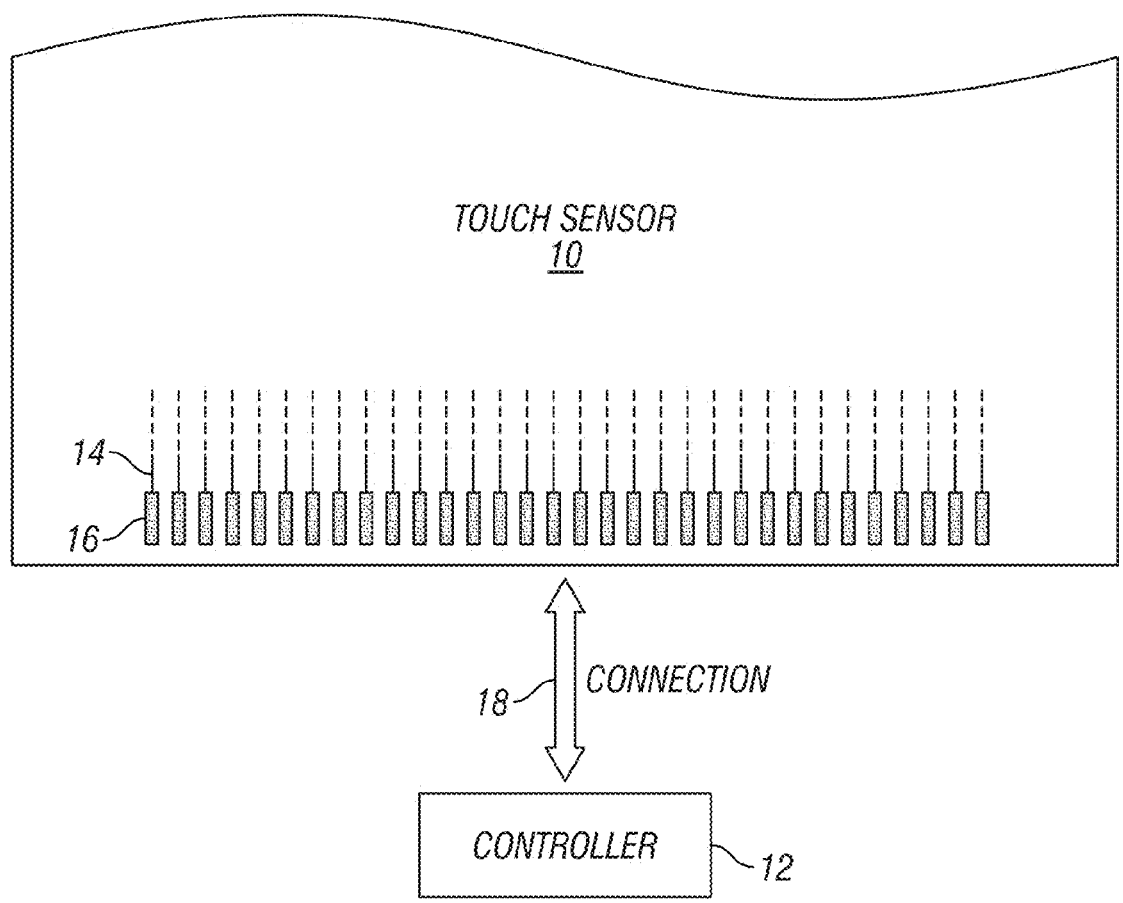
FIG. 1 illustrates a touch sensor with an example controller, according to example embodiments.

FIG. 1 illustrates an example touch sensor 10 with an example controller 12. Herein, reference to a touch sensor may encompass a touch screen, and vice versa, where appropriate. Touch sensor 10 and controller 12 detect the presence and location of a touch or the proximity of an object within a touch-sensitive area of touch sensor 10. Herein, reference to a touch sensor encompasses both the touch sensor and its controller, where appropriate. Similarly, reference to a controller encompasses both the controller and its touch sensor, where appropriate. Touch sensor 10 includes one or more touch-sensitive areas, where appropriate. Touch sensor 10 includes an array of drive and sense electrodes disposed on a substrate, which in some embodiments is a dielectric material.

In certain embodiments, one or more portions of the substrate of touch sensor 10 are made of polyethylene terephthalate (PET), flexible printed circuit board (FPCB) material, copper on polyimide, or another suitable material. This disclosure contemplates any suitable substrate with any suitable portions made of any suitable material. In particular embodiments, the drive electrodes, sense electrodes, and other conductors in touch sensor 10 are made of indium tin oxide (ITO), copper or copper-based materials, silver or silver-based materials, carbon-based materials (e.g., graphene plus carbon nanotubes, buds, and wires), conductive polymers, or any other appropriate material, in whole or in part. In particular embodiments, the drive or sense electrodes in touch sensor 10 are made of fine lines of metal or other conductive material. As an example and not by way of limitation, one or more portions of the conductive material are copper or copper-based and have a thickness of approximately 5 μm or less and a width of approximately 10 μm or less. As another example, one or more portions of the conductive material are silver or silver-based and similarly have a thickness of approximately 5 μm or less and a width of approximately 10 μm or less. This disclosure contemplates any suitable electrodes made of any suitable material.

In certain embodiments, touch sensor 10 implements a capacitive form of touch sensing. In a mutual-capacitance implementation, touch sensor 10 includes an array of drive and sense electrodes forming an array of capacitive nodes. In certain embodiments, a drive electrode and a sense electrode form a capacitive node. The drive and sense electrodes forming the capacitive node come near each other, but do not make electrical contact with each other.

Instead, the drive and sense electrodes are capacitively coupled to each other across a gap between them. A pulsed or alternating voltage applied to the drive electrode (i.e., by controller 12) induces a charge on the sense electrode, and the amount of charge induced is susceptible to external influence (such as a touch or the proximity of an object). When an object touches or comes within proximity of the capacitive node, a change in capacitance occurs at the capacitive node and controller 12 measures the change in capacitance. By measuring changes in capacitance throughout the array, controller 12 determines the position of the touch or proximity within the touch-sensitive area(s) of touch sensor 10.

In particular embodiments, one or more drive electrodes together form a drive line running horizontally or vertically or in any suitable orientation. Similarly, one or more sense electrodes together form a sense line running horizontally or vertically or in any suitable orientation. In particular embodiments, drive lines run substantially perpendicular to sense lines. Herein, reference to a drive line encompasses one or more drive electrodes making up the drive line, and vice versa, where appropriate. Similarly, reference to a sense line encompasses one or more sense electrodes making up the sense line, and vice versa, where appropriate.

In certain embodiments, touch sensor 10 has a single-layer configuration, with drive and sense electrodes disposed in a pattern on one side of a substrate. In such a configuration, a pair of drive and sense electrodes capacitively coupled to each other across a space between them forms a capacitive node. In a single-layer configuration for a self-capacitance implementation, electrodes of only a single type (e.g. drive) are disposed in a pattern on one side of the substrate. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 is operable to detect and process the change in capacitance to determine the presence and location of the touch or proximity input. Certain embodiments if controller 12 communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

In certain embodiments, controller 12 is one or more integrated circuits (ICs)—such as for example general-purpose microprocessors, microcontrollers, programmable logic devices or arrays, and application-specific ICs (ASICs). In some embodiments, controller 12 is coupled to a flexible printed circuit (FPC) bonded to the substrate of touch sensor 10, as described below. Certain embodiments of controller 12 include a processor unit, a drive unit, a sense unit, and a storage unit. The drive unit supplies drive signals to the drive electrodes of touch sensor 10. The sense unit senses charge at the capacitive nodes of touch sensor 10 and provides measurement signals to the processor unit representing capacitances at the capacitive nodes. The processor unit controls the supply of drive signals to the drive electrodes by the drive unit and process measurement signals from the sense unit to detect and process the presence and location of a touch or proximity input within the touch-sensitive area(s) of touch sensor 10. The processor unit also tracks changes in the position of a touch or proximity input within the touch-sensitive area(s) of touch sensor 10. The storage unit, which includes one or more memory devices, stores programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 couple the drive or sense electrodes of touch sensor 10 to connection pads 16, also disposed on the substrate of touch sensor 10. As described below, connection pads 16 facilitate coupling of tracks 14 to controller 12. In certain embodiments, tracks 14 extend into or around (e.g. at the edges of) the touch-sensitive area(s) of touch sensor 10. Particular tracks 14 provide drive connections for coupling controller 12 to drive electrodes of touch sensor 10, through which the drive unit of controller 12 supplies drive signals to the drive electrodes. Other tracks 14 provide sense connections for coupling controller 12 to sense electrodes of touch sensor 10, through which the sense unit of controller 12 senses charge at the capacitive nodes of touch sensor 10. In certain embodiments, tracks 14 are made of fine lines of metal or other conductive material. As an example and not by way of limitation, the conductive material of tracks 14 is copper or copper-based and has a width of approximately 100 µm or less. As another example, the conductive material of tracks 14 is silver or silver-based and has a width of approximately 100 µm or less. In particular embodiments, tracks 14 are made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, certain embodiments of touch sensor 10 include one or more ground lines terminating at a ground connector (similar to a connection pad 16) at an edge of the substrate of touch sensor 10 (similar to tracks 14).

In certain embodiments, connection pads 16 are located along one or more edges of the substrate, outside the touch-sensitive area(s) of touch sensor 10. As described above, controller 12 is on an FPC in certain embodiments. In some embodiments, connection pads 16 are made of the same material as tracks 14 and are bonded to the FPC using an anisotropic conductive film (ACF). In certain embodiments, connection 18 includes conductive lines on the FPC coupling controller 12 to connection pads 16, in turn coupling controller 12 to tracks 14 and to the drive or sense electrodes of touch sensor 10. In another embodiment, connection pads 160 are inserted into an electro-mechanical connector (such as a zero insertion force wire-to-board connector); in this embodiment, connection 180 does not need to include an FPC. This disclosure contemplates any suitable connection 18 between controller 12 and touch sensor 10.

Figure 2:
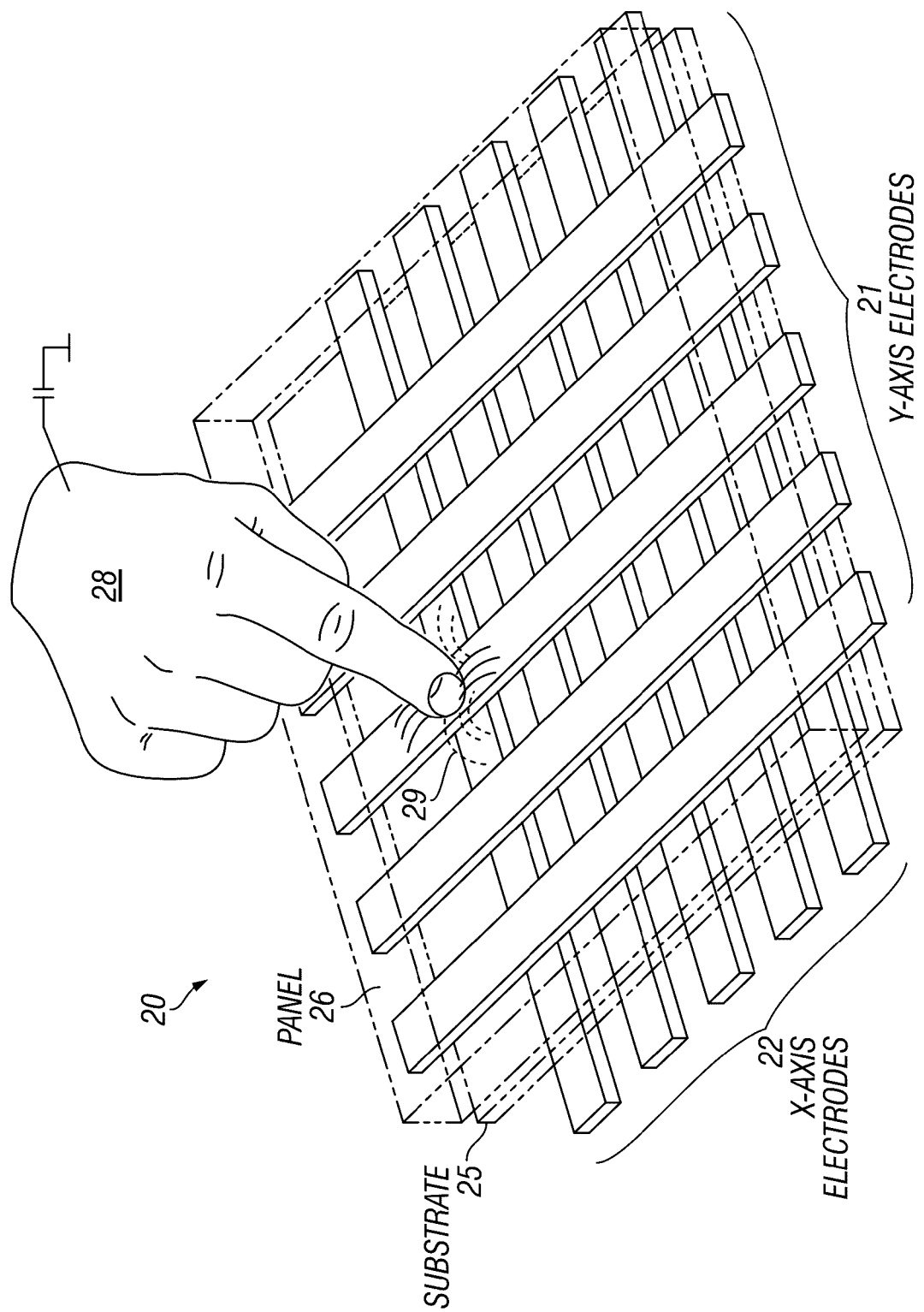
FIG. 2 illustrates an example embodiment of the touch sensor of FIG. 1, according to certain embodiments.

FIG. 2 illustrates a touch sensor 20 that may be utilized as touch sensor 10 of FIG. 1. Touch sensor 20 includes x-axis electrodes 22, y-axis electrodes 21, a substrate 25, and a panel 26. In some embodiments, x-axis electrodes 22 and y-axis electrodes 21 are electrodes in a self capacitance implementation (i.e., each x-axis electrode 22 and y-axis electrode 21 is capable of being driven and measured during the acquisition). In some embodiments, x-axis electrodes 22 are drive electrodes and y-axis electrodes 21 are sense electrodes in a mutual capacitance implementation.

In some embodiments, panel 26 is a transparent panel. In other embodiments, panel 26 is not transparent. In some embodiments, substrate 25 is sandwiched between x-axis electrodes 22 and y-axis electrodes 21, and y-axis electrodes 21 are coupled to an underside of panel 26 with, for example, an adhesive. In other embodiments, touch sensor 20 includes any appropriate configuration and number of layers of electrodes and substrates. For example, some embodiments of touch sensor 20 include additional layers of sense electrodes 22 that run perpendicular (or any other appropriate angle) to y-axis electrodes 21. In some embodiments, x-axis electrodes 22 and y-axis electrodes 21 are on the same layer in any appropriate pattern (e.g., a design in which x-axis electrodes 22 and y-axis electrodes 21 have interdigitated teeth, as illustrated in FIGS. 4A-8). In some embodiments, substrate 25 may be flexible and may be made of any appropriate material such as polyimide, polyethylene terephthalate (PET) with ITO, or FR4.

In certain mutual capacitance embodiments, touch sensor 20 determines the location of a touch object 28 (e.g., a person's finger, a stylus, etc.) at least in part by using controller 12 to apply a pulsed or alternating voltage to x-axis electrodes 22, which induces a charge on y-axis electrodes 21 (or vice versa). In certain self capacitance embodiments, touch sensor 20 determines the location of touch object 28 at least in part by using controller 12 to apply a pulsed or alternating voltage to x-axis electrodes 22 and y-axis electrodes 21. When touch object 28 touches or comes within proximity of an active area of touch sensor 20, a change in capacitance may occur, as depicted by electric field lines 29. In mutual capacitance embodiments, the change in capacitance is sensed by the sense (i.e., receiving) electrodes and measured by controller 12. In self capacitance embodiments, the change in capacitance is sensed by x-axis electrodes 22 and y-axis electrodes 21 and measured by controller 12. By measuring changes in capacitance throughout an array of x-axis electrodes 22 and y-axis electrodes 21, controller 12 determines the position of touch object 28 within the touch-sensitive area(s) of touch sensor 20.

Figure 3:
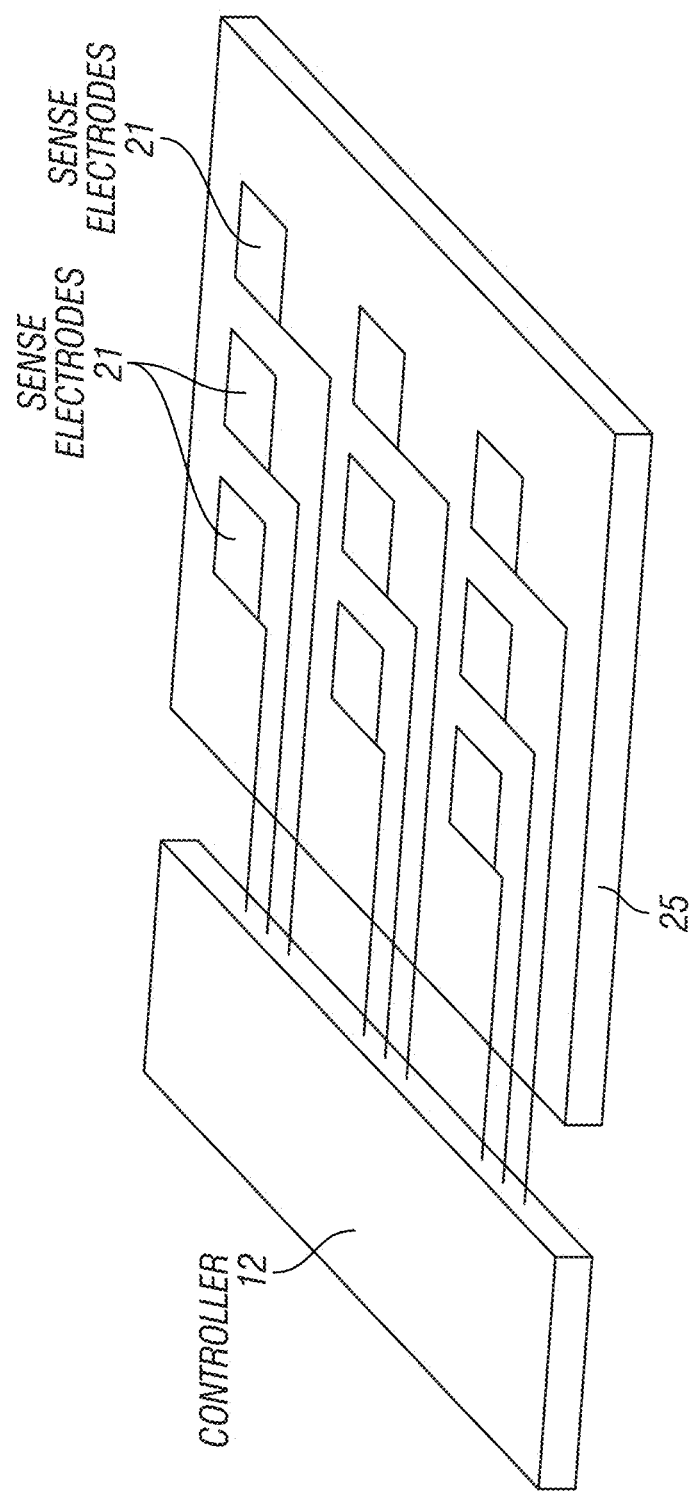
FIG. 3 illustrates another example embodiment of the touch sensor of FIG. 1, according to certain embodiments.

FIG. 3 illustrates a self-capacitance embodiment of touch sensor 10. In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

Figure 4A:
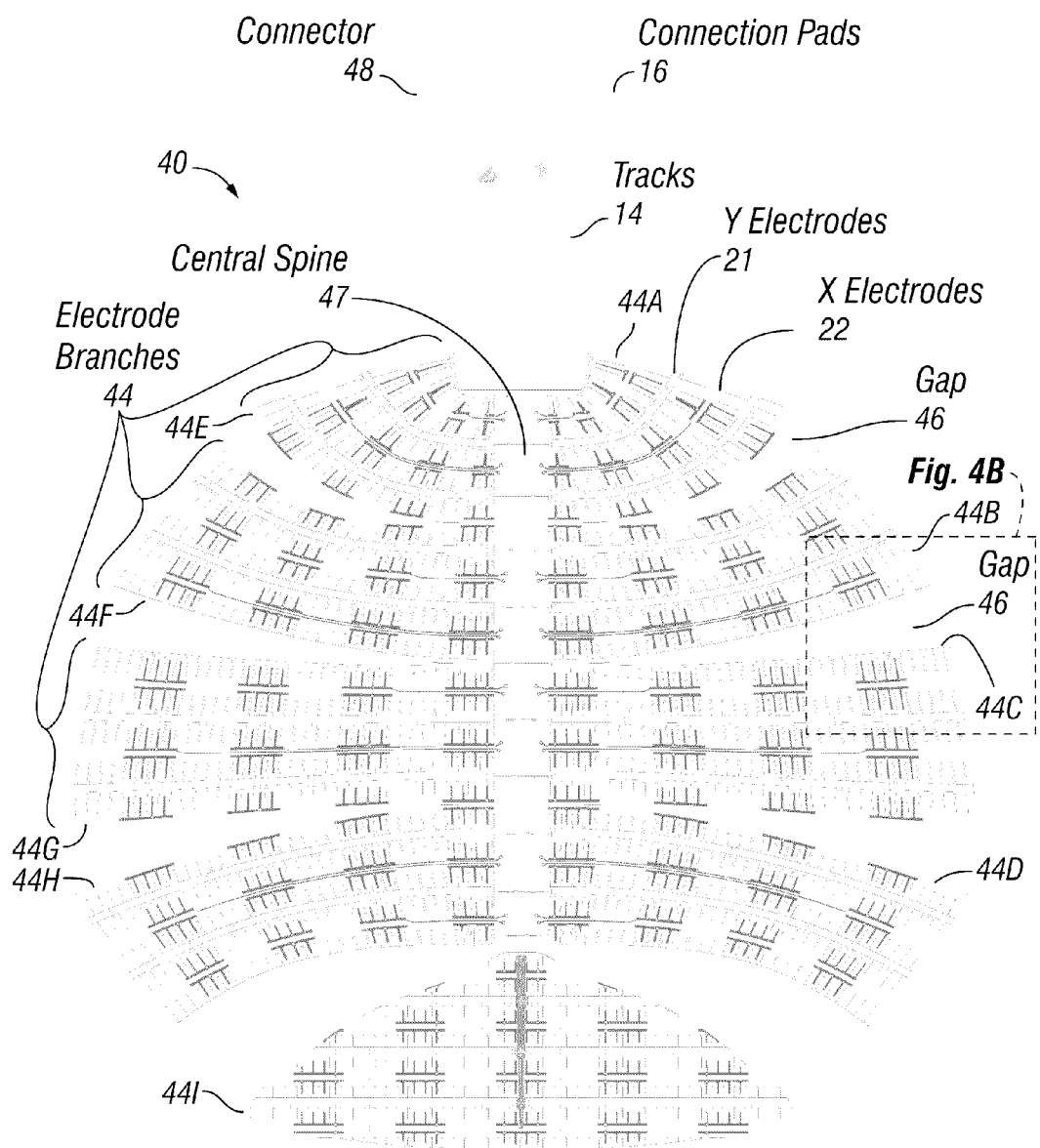
FIGS. 4A and 4B illustrate a pattern for the touch sensor of FIG. 1 for curved surfaces, according to example embodiments.
Figure 4B:
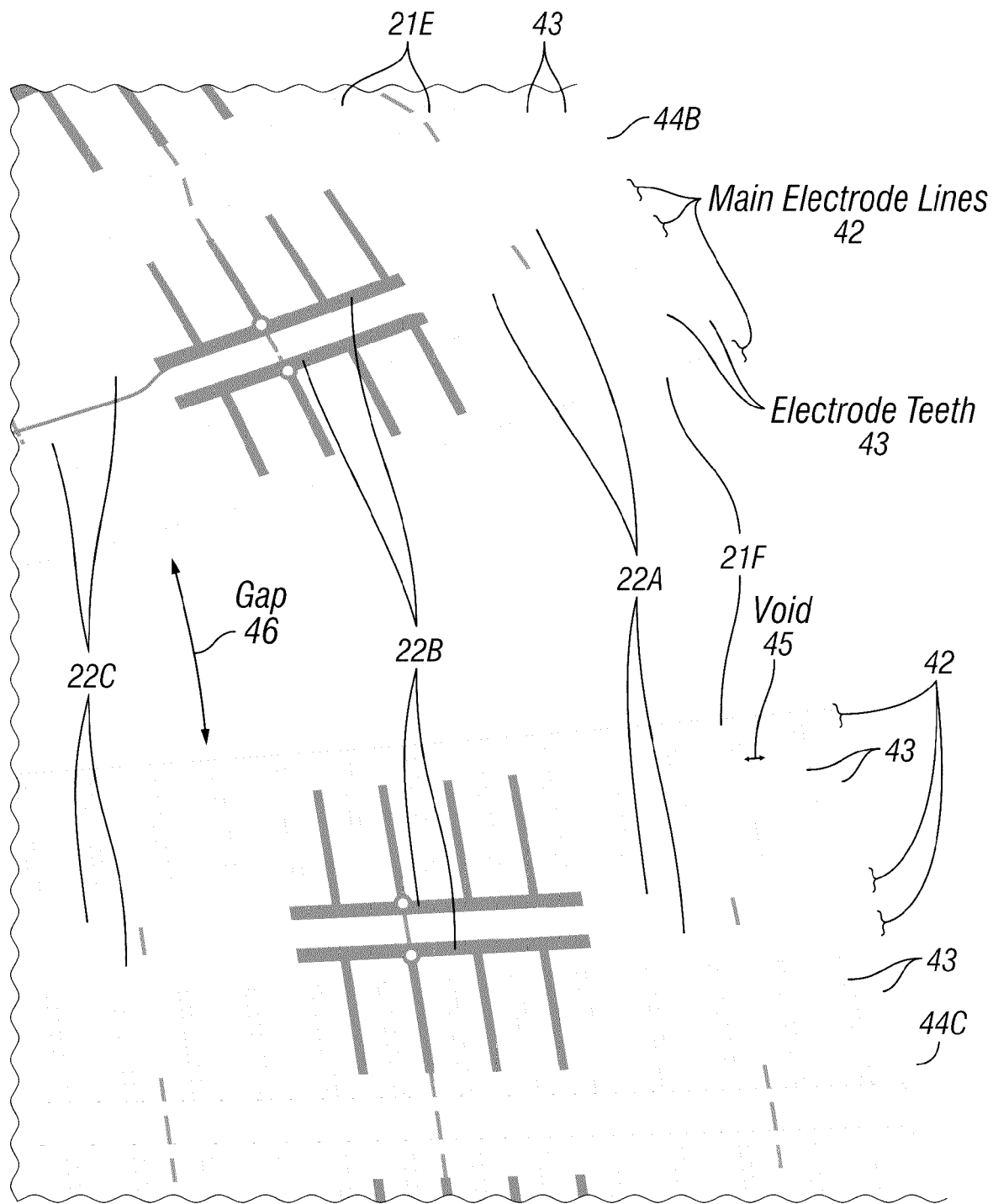

FIGS. 4A and 4B illustrate a touch sensor 40 that may be utilized as touch sensor 10. Portions of touch sensor 40 are flexible, which allows touch sensor 40 to be utilized on curved surfaces such as a computer mouse, a car's gear shift, or any other three-dimensional surface. Touch sensor 40 includes electrode branches 44 that are coupled to a central spine 47. Electrode branches 44 are separated from other electrode branches 44 by gaps 46. Each electrode branch 44 includes x-axis electrodes 22 (illustrated in light and dark pink) and y-axis electrodes 21 (illustrated in blue) that collectively define a touch-sensitive area of touch sensor 40. Y-axis electrodes 21 are illustrated in more detail in FIGS. 5 and 8, and x-axis electrodes 22 are illustrated in more detail in FIGS. 6 and 7.

X-axis electrodes 22 and y-axis electrodes 21 are coupled to connection pads 16 of a connector 48 via tracks 14. Connector 48 may then be communicatively coupled to controller 12. While a particular number, arrangement, and pattern of electrode branches 44, x-axis electrodes 22, y-axis electrodes 21, central spine 47, and tracks 14 is illustrated in FIGS. 4A and 4B, other embodiments may have any appropriate number, arrangement, or pattern of these elements. Furthermore, y-axis electrodes 21 may be sense electrodes and x-axis electrodes 22 may be drive electrodes in some embodiments, while y-axis electrodes 21 may be drive electrodes and x-axis electrodes 22 may be sense electrodes in other embodiments.

Figure 10A:
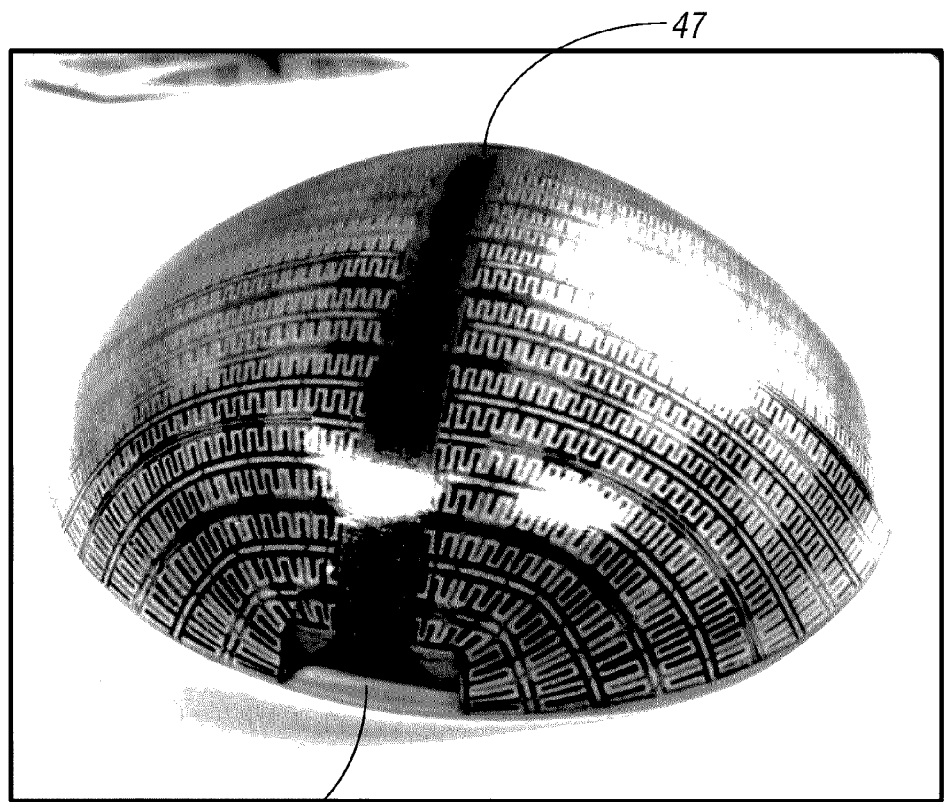
FIGS. 10A and 10B illustrate the touch sensor pattern of FIG. 4 that has been formed into a three-dimensional shape, according to example embodiments.
Figure 10B:
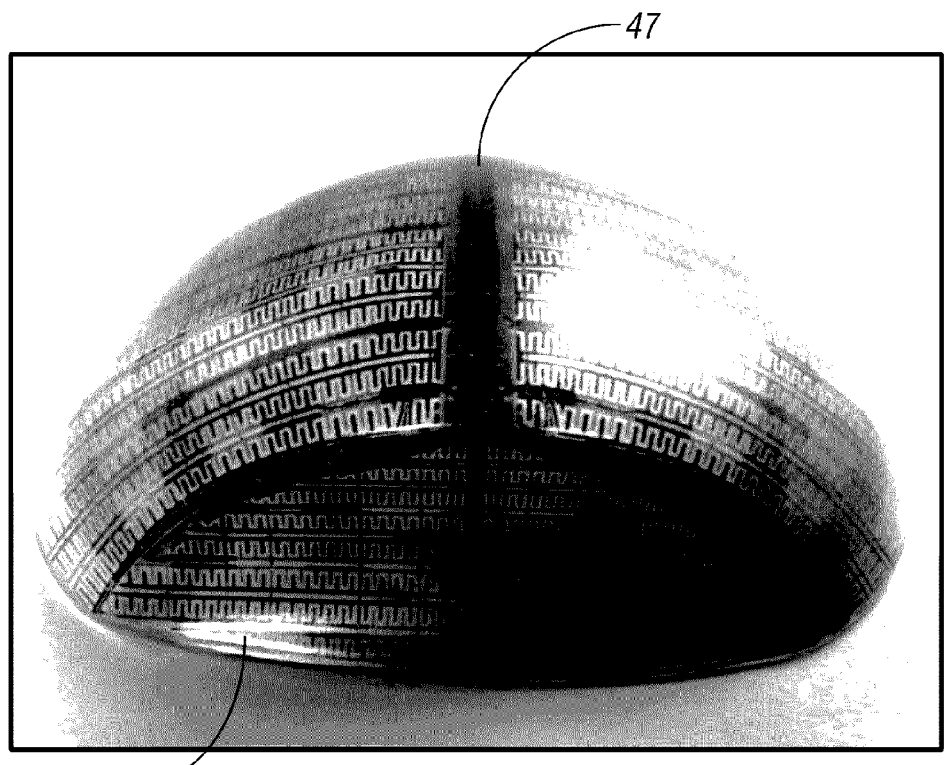

In general, touch sensor 40 provides a flexible touch sensor that may formed into any three-dimensional shape, including shapes that are curved in one or two planes. Typical touch sensors are utilized on flat surfaces such as the screen of a smartphone. Touch sensor 40, however, may be formed over any three-dimensional (e.g., curved) surface such as a computer mouse. To do so, touch sensor 40 utilizes a flexible substrate 25 with y-axis electrodes 21 and x-axis electrodes 22 that is formed into an appropriate shape when flat, but provides a substantially continuous touch-sensitive surface when formed into the desired three-dimensional shape. For example, touch sensor 40, which is to be utilized on the surface of a computer mouse as illustrated in FIGS. 10A and 10B, is formed into a shape that includes electrode branches 44 (e.g., electrode branches 44A-44I) coupled to central spine 47. When flat, touch sensor 40 includes gaps 46 between electrode branches 44 (e.g., between electrode branches 44A and 44B). When formed into the desired three-dimensional shape, however, gaps 46 are eliminated or substantially reduced so that adjacent electrode branches 44 come in close proximity to each other and form a substantially continuous touch-sensitive surface.

An electrode (whether a y-axis electrode 21 or an x-axis electrode 22) is an area of conductive material forming a shape, such as for example a disc, square, rectangle, line with teeth, other suitable shape, or suitable combination of these. In particular embodiments, the conductive material of an electrode occupies approximately 100% of the area of its shape. As an example and not by way of limitation, y-axis electrodes 21 and x-axis electrodes 22, along with any electrode connectors, are made of ITO and the ITO of the electrodes occupies approximately 100% of the area of its shape, where appropriate. In particular embodiments, the conductive material of an electrode occupies approximately 50% of the area of its shape. As an example and not by way of limitation, an electrode is made of ITO, and the ITO of the electrode occupies approximately 50% of the area of its shape in a hatched or other suitable pattern.

In particular embodiments, the conductive material of an electrode occupies approximately 5% of the area of its shape. As an example and not by way of limitation, an electrode is made of fine lines of metal (such as for example copper, silver, or a copper- or silver-based material) or other conductive material and the fine lines of conductive material occupy approximately 5% of the area of its shape in a hatched or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor constitute in whole or in part one or more macro-features of certain embodiments of the touch sensor. One or more characteristics of the implementation of those shapes (such as, for example, the conductive materials, fills, or patterns within the shapes or the means of electrically isolating or physically separating the shapes from each other) constitute in whole or in part one or more micro-features of certain embodiments of the touch sensor.

Y-axis electrodes 21 and x-axis electrodes 22 are coupled to tracks 14 which communicatively couple the electrodes to controller 12 via connector 48. As described above, controller 12 transmits drive signals to drive electrodes and receives sensing signals from sense electrodes through tracks 14 to determine the position of an object adjacent to touch sensor 40 (e.g., a finger or a stylus). Tracks 14 are routed through central spine 47.

In some embodiments, y-axis electrodes 21 and x-axis electrodes 22 include individual electrode "teeth" 43 that protrude from a main electrode line 42, as illustrated in detail in FIG. 4B. In certain embodiments, electrode teeth 43 of each y-axis electrode 21 are adjacent to one or more electrode teeth 43 of x-axis electrodes 22 and thereby form capacitive coupling edges that are separated by void 45. The electrode teeth 43 of the y-axis electrodes 21 and x-axis electrodes 22 may be interdigitated (i.e., the electrode teeth 43 alternate as illustrated) in order to increase the number of capacitive coupling edges between the electrodes. In some embodiments, y-axis electrodes 21 and x-axis electrodes 22 may be interleaved in any other appropriate configuration (e.g., a caterpillar design, etc.).

Figure 5:
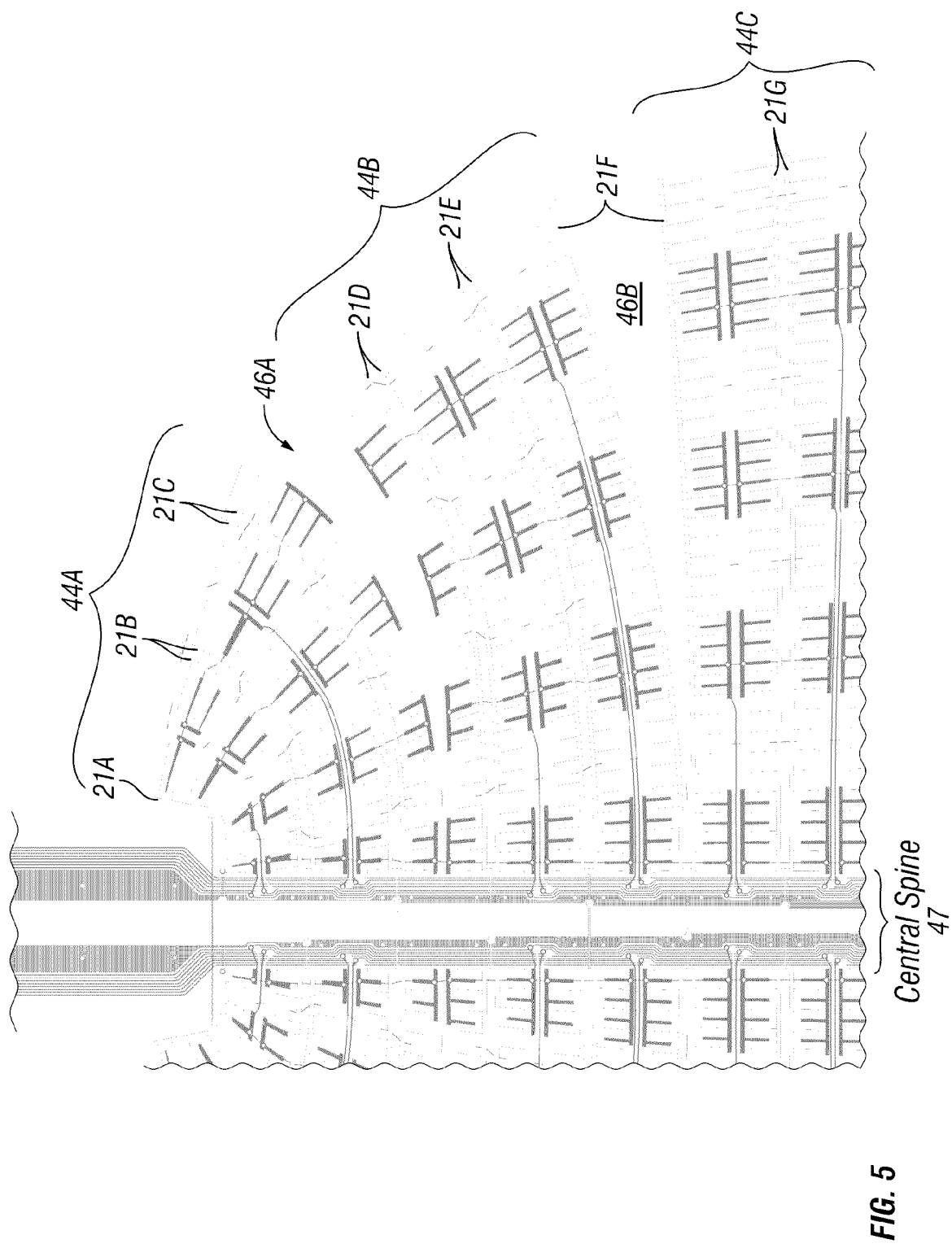
FIG. 5 illustrates y-axis electrodes of the touch sensor pattern of FIG. 4, according to example embodiments.
Figure 6:
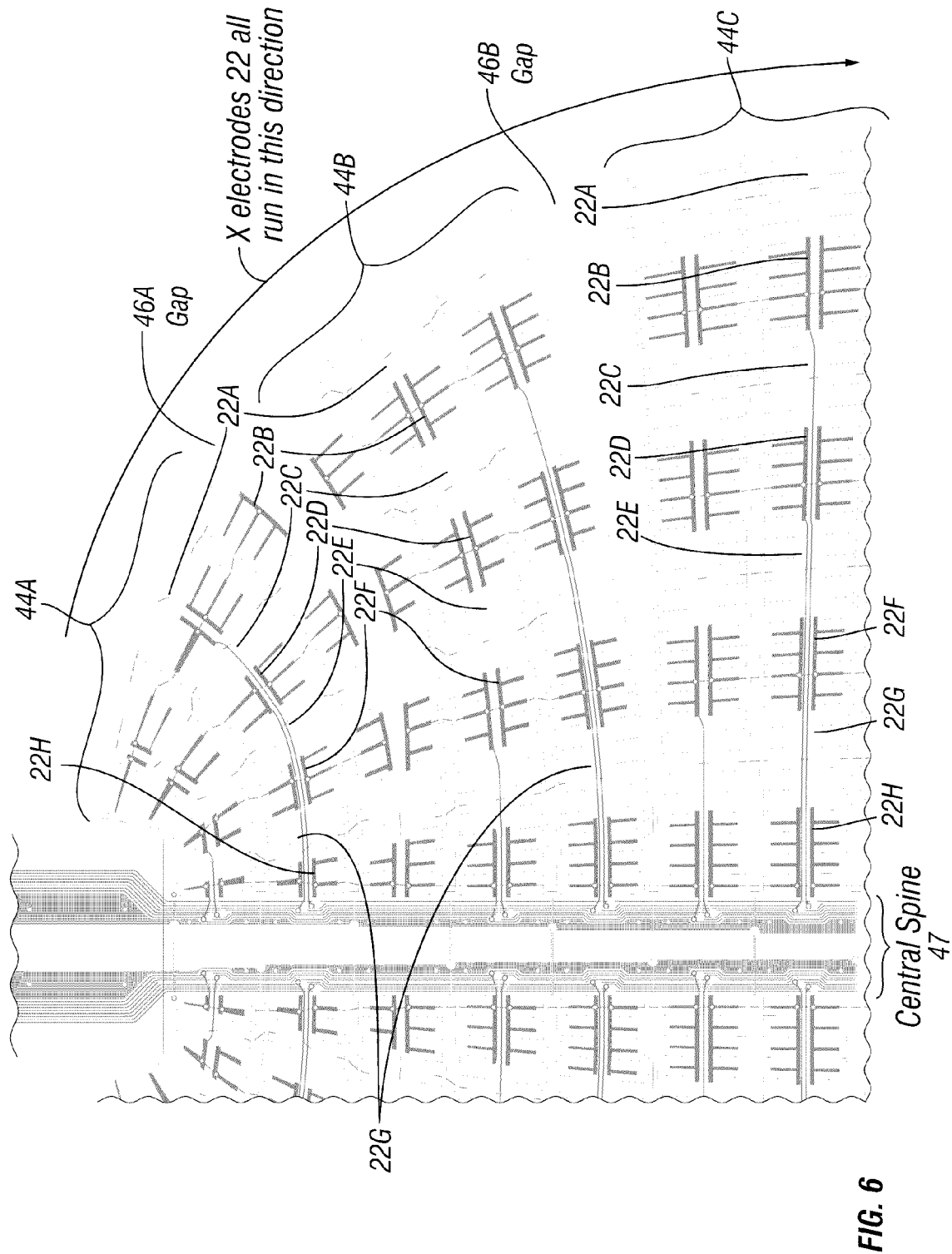
FIG. 6 illustrates x-axis electrodes of the touch sensor pattern of FIG. 4, according to example embodiments.

Gaps 46 (e.g., gaps 46A and 46B as illustrated in FIG. 5) are any appropriate separation of electrode branches 44 that allow touch sensor 40 to be formed into any appropriate three-dimensional shape. In some embodiments, gaps 46 may separate particular y-axis electrodes 21 (e.g., y-axis electrode 21F as illustrated in FIG. 5) or may separate x-axis electrodes 22 (e.g., x-axis electrodes 22A-22H of electrode branches 44A and 44B as illustrated in FIG. 6). If touch sensor 40 was in operation while flat as illustrated in FIGS. 4A-9 (e.g., not formed into a three-dimensional shape as illustrated in FIGS. 10A and 10B), touch sensor 40 would not be able to detect touches by touch object 28 within gaps 46. However, gaps 46 are substantially eliminated when touch sensor 40 is formed into the appropriate three-dimensional shape. This allows adjacent electrode branches 44 to be sufficiently close together (i.e., allows y-axis electrodes 21 and x-axis electrodes 22 that were previously separated by gaps 46 to be brought together), thereby creating a substantially continuous touch-sensitive surface.

In some embodiments, void 45 is substantially uniform (e.g., void 45 between y-axis electrodes 21 and x-axis electrodes 22 and their corresponding electrode teeth 43 is substantially the same width). In other embodiments, void 45 may not be uniform. In addition, certain embodiments include y-axis electrodes 21, x-axis electrodes 22, and electrode teeth 43 that have substantially similar widths (e.g., the widths of electrode teeth 43 and main electrode lines 42 of y-axis electrodes 21 and x-axis electrodes 22 are substantially the same). In other embodiments, y-axis electrodes 21, x-axis electrodes 22, and electrode teeth 43 do not have substantially similar widths (e.g., the widths of electrode teeth 43 and main electrode lines 42 of y-axis electrodes 21 and x-axis electrodes 22 are not substantially the same). In some embodiments, void 45 is substantially filled with "in-fill" shapes that are floating (e.g., not electrically coupled to anything such as y-axis electrodes 21 or x-axis electrodes 22). In such embodiments, a smaller void will separate the in-fill shapes and the electrodes. In certain embodiments, the material in void 45 is the same material as y-axis electrodes 21 and x-axis electrodes 22. Although this disclosure describes and illustrates a particular arrangement of electrodes for touch sensor 40, this disclosure contemplates any suitable arrangement of electrodes for touch sensor 40.

In some embodiments, the width of the discrete pieces of material forming the various portions of y-axis electrodes 21, x-axis electrodes 22, electrode teeth 43, main electrode lines 42, etc., and the spacing between those pieces and other portions of touch sensor 40, is not uniform. In certain embodiments, the widths of those pieces and the spacing between them and other portions of touch sensor 40 is substantially uniform. In embodiments where the widths of those pieces and the spacing between them is substantially uniform, visual artifacts are reduced and images viewed through the sensor are affected less than with non-uniform sensors. In such uniform sensor embodiments, the uniformity can be achieved by appropriate design of the various portions of the electrodes of touch sensor 40 and/or by adjusting the spacing between them. As just one example, disconnected pieces of the same material used to form the electrodes of touch sensor 40 may be positioned in any open spaces of touch sensor 40. Such disconnected pieces of material used to fill the open spaces of touch sensor 40 are not electrically connected to any tracks 14 and do not function as electrodes.

Optical properties of void 45 as well as voids within other areas of the array with large dimensions relative to feature sizes of the electrodes may have different optical properties than the optical properties of the electrodes (either y-axis electrodes 21 or x-axis electrodes 22). Optical discontinuities may occur when viewing a display underneath touch sensor 40 due to these differences in optical properties. In certain embodiments, voids 45 and other voids within other areas of the array may be substantially filled using the conductive material used to fabricate y-axis electrodes 21 and x-axis electrodes 22 in such a way to electrically isolate the filled-in areas from nearby y-axis electrodes 21 and x-axis electrodes 22 or tracks 14. In particular embodiments, voids 45 and other voids may be substantially filled using in-fill shapes of electrode conductive material isolated from neighboring in-fill shapes by non-conducting gaps. The isolated in-fill shapes may serve to visually obscure a pattern of y-axis electrodes 21 and x-axis electrodes 22, while having a minimal impact on the fringing fields between adjacent electrodes. Therefore, using in-fill shapes may have electric field distributions substantially similar to electric field distributions without in-fill shapes. In certain embodiments, the in-filling is formed during manufacture and using the same process steps as y-axis electrodes 21 and x-axis electrodes 22, such that the in-fill shapes are formed from the same material and have substantially the same thickness and electrical properties as y-axis electrodes 21 and x-axis electrodes 22.

Filling in voids 45 and other voids using in-fill shapes reduces a number of areas with optical discontinuities visible when viewing the display. In particular embodiments, in-fill shapes are formed using metal, conductive plastic, ITO, or other form of conductive material, such as fine line metal. In certain embodiments, the material used to fill in a void 45 and other voids depends on the conductive material used to fabricate y-axis electrodes 21 and x-axis electrodes 22. As an example and not by way of limitation, certain embodiments of voids 45 and other voids are substantially filled in using a series of electrically isolated squares formed during fabrication of y-axis electrodes 21 and x-axis electrodes 22. Although this disclosure describes or illustrates particular in-fill shapes having particular patterns, this disclosure contemplates any suitable in-fill shapes having any suitable patterns.

Figure 9:
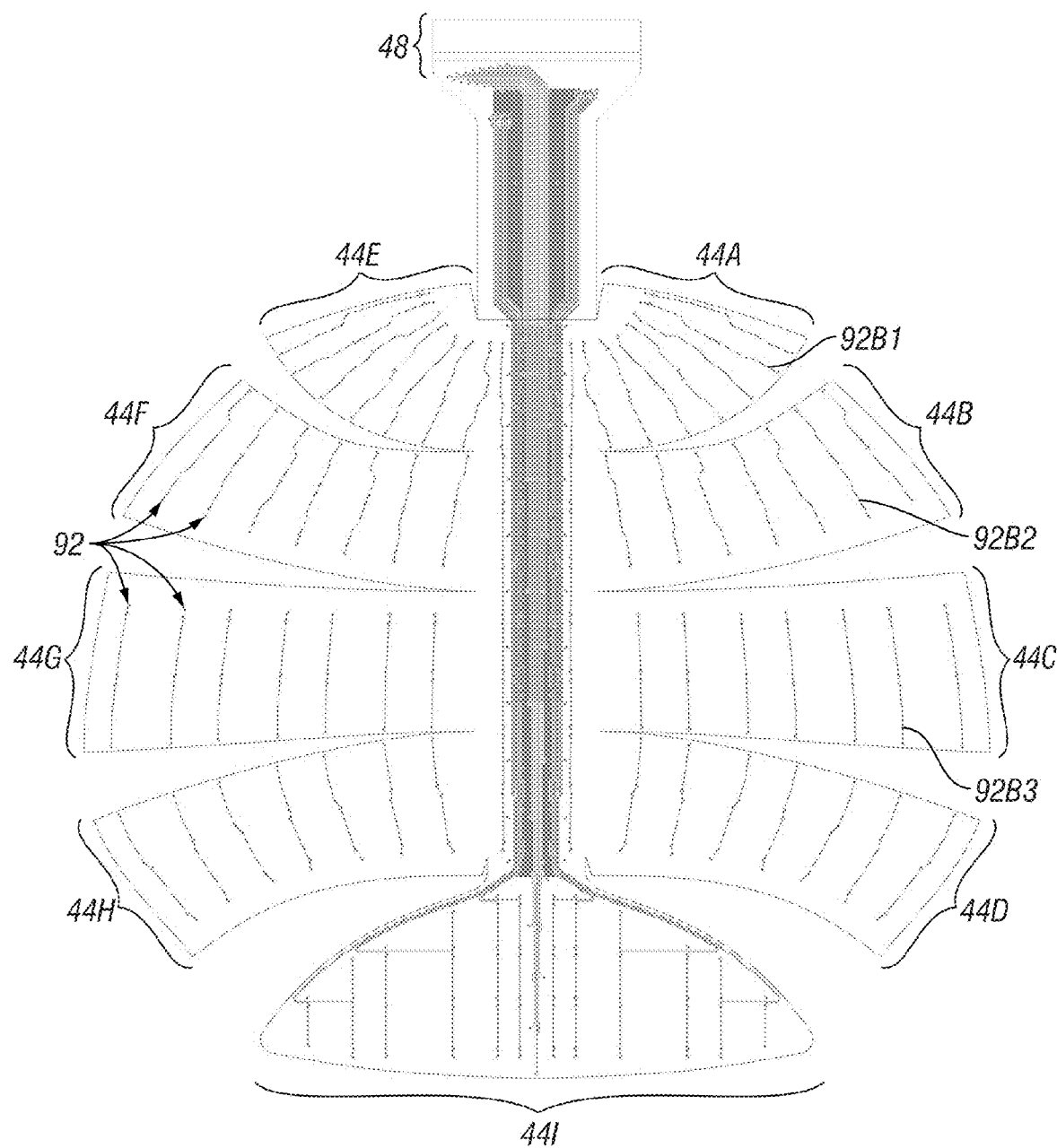
FIG. 9 illustrates a connection layer for connecting the x-axis electrodes of the touch sensor pattern of FIG. 4, according to example embodiments.

In some embodiments, touch sensor 40 may be formed on a single layer, while other embodiments may utilize two or more layers. For example, the illustrated embodiment of FIGS. 4A and 4B utilizes two layers—a first layer in which x-axis electrodes 22 and y-axis electrodes 21 are formed, and a second layer that includes connection lines 92 as illustrated in FIG. 9. In some embodiments, a first layer (e.g., for y-axis electrodes 21 and x-axis electrodes 22) may reside on one side of a base material (e.g., a flexible substrate 25), while a second layer (e.g., for connection lines 92) resides on the opposite side of the base material. In some embodiments, a coverlay may be placed on top of the first and/or second layers. In some embodiments, an adhesive material such as 3M467 may be laminated to the top and/or bottom side of touch sensor 40.

FIG. 5 illustrates one embodiment of y-axis electrodes 21 of touch sensor 40 of FIG. 4. In this embodiment, y-axis electrodes 21 (e.g., y-axis electrodes 21A-21G, illustrated in blue) extend outward from central spine 47 to the tips of electrode branches 44. That is, main electrode lines 42 of y-axis electrodes 21 are perpendicular to central spine 47 and the tips of electrode branches 44, and the electrode teeth 43 of y-axis electrodes 21 are parallel to central spine 47 and the tips of electrode branches 44. In this embodiment, each electrode branch 44 includes more than one y-axis electrodes 21. For example, electrode branch 44A includes three y-axis electrodes 21 (i.e., 21A-21C), while electrode branch 44B includes two complete y-axis electrodes (i.e., 21D and 21E) and half of another y-axis electrode 21 (i.e., 21F). In addition, some y-axis electrodes 21 include two main electrode lines 42 (e.g., 21B-21G), while other y-axis electrodes 21 include only one main electrode line 42 (e.g., 21A).

In some embodiments, the two main electrode lines 42 of certain y-axis electrodes 21 are adjacent to each other when touch sensor 40 is flat (e.g., y-axis electrodes 21B-21E). In other embodiments, the two main electrode lines 42 of certain y-axis electrodes 21 are not adjacent to each other when touch sensor 40 is flat, but are adjacent to each other when touch sensor 40 is formed into a three-dimensional shape. For example, the main electrodes line 42 of y-axis electrode 21F are separated by gap 46B when touch sensor 40 is flat (i.e., half of y-axis electrode 21F is located on electrode branch 44B and the other half of y-axis electrode 21F is located on electrode branch 44C.) However, when touch sensor 40 is formed into a three-dimensional shape, gap 46B is substantially eliminated, thereby causing the main electrodes lines 42 of y-axis electrode 21F to become adjacent to one another. This creates a substantially continuous touch-sensitive surface between electrode branches 44B and 44C.

Figure 8:
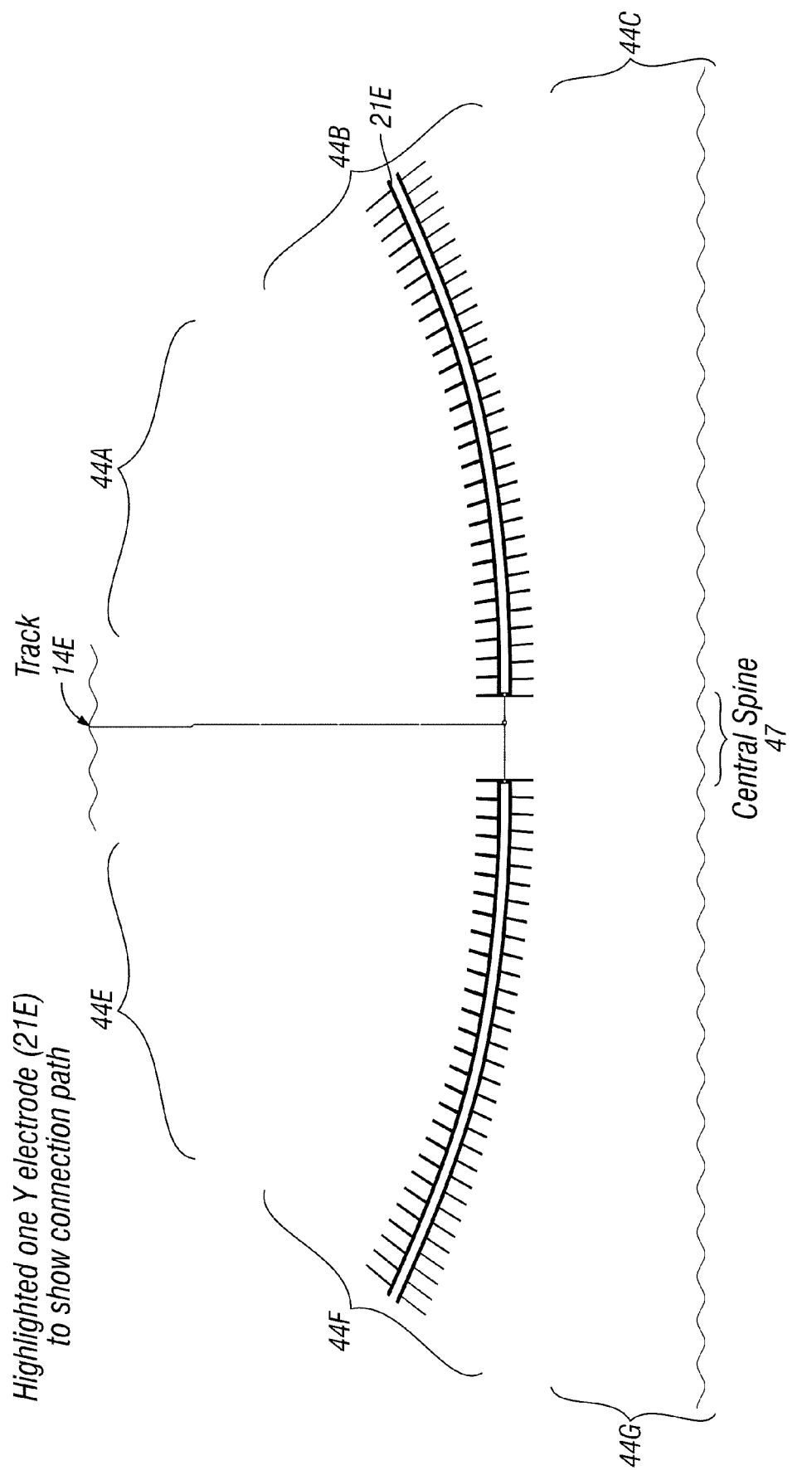
FIG. 8 illustrates a particular y-axis electrode of the touch sensor pattern of FIG. 4, according to example embodiments.

In some embodiments, certain y-axis electrodes 21 that are located on different electrode branches 44 may be coupled together and share a common track 14. For example, y-axis electrodes 21 that are adjacent to each other across central spine 47 may be coupled to a common track 14 in certain embodiments, as illustrated in FIG. 8. In the illustrated embodiment of FIG. 8, y-axis electrode 21E (located on electrode branch 44B) is coupled to an adjacent y-axis electrode 21 (on electrode branch 44F) via track 14E. This allows controller 12 to communicate with both electrodes simultaneously and effectively creates a single electrode that spans from the tip of electrode branch 44F to the tip of electrode branch 44B.

FIG. 6 illustrates one embodiment of x-axis electrodes 22 of touch sensor 40 of FIG. 4. In this embodiment, x-axis electrodes 22 (e.g., x-axis electrodes 22A-22H, illustrated in dark and light pink) collectively extend outward from central spine 47 to the tips of electrode branches 44 in a similar manner as y-axis electrodes 21. Unlike y-axis electrodes 21, however, x-axis electrodes 22 are not continuous from central spine 47 to the tips of electrode branches 44 (i.e., the main electrode lines 42 of x-axis electrodes 22 do not run continuously from central spine 47 to the tips of electrode branches 44). Instead, each x-axis electrode 22 occupies only a portion of the distance between central spine 47 and the tip of a particular electrode branch 44. For example, x-axis electrode 22A (illustrated in light pink) is located at the tip of electrode branches 44 (i.e., the end of electrode branches 44 opposite central spine 47). X-axis electrode 22B (illustrated in dark pink), which is not electrically coupled to x-axis electrode 22A, is located adjacent to x-axis electrode 22A towards central spine 47. Similarly, x-axis electrode 22C is adjacent to x-axis electrode 22B, x-axis electrode 22D is adjacent to x-axis electrode 22C, x-axis electrode 22E is adjacent to x-axis electrode 22D, x-axis electrode 22F is adjacent to x-axis electrode 22E, x-axis electrode 22G is adjacent to x-axis electrode 22F, and x-axis electrode 22H is adjacent to x-axis electrode 22G, as illustrated in FIG. 6. None of x-axis electrodes 22 are electrically coupled to any other x-axis electrodes 22. However, as described in more detail below, corresponding x-axis electrodes 22 of electrode branches 44 are electrically coupled together (i.e., x-axis electrodes 22A of electrode branch 44A are coupled to x-axis electrodes 22A of electrode branches 44B-44D, and so forth).

In some embodiments, x-axis electrodes 22 include two main electrode lines 42, while other x-axis electrodes 22 include only one main electrode line 42. In some embodiments, the two main electrode lines 42 of certain x-axis electrodes 22 are not adjacent to each other when touch sensor 40 is flat, but are adjacent to each other when touch sensor 40 is formed into a three-dimensional shape. For example, the main electrodes lines 42 of x-axis electrodes 22A-22G on electrode branches 44A and 44B are separated by gap 46A when touch sensor 40 is flat (i.e., half of x-axis electrodes 22A-22G are located on electrode branch 44A and the other half of x-axis electrodes 22A-22G are located on electrode branch 44B.) However, when touch sensor 40 is formed into a three-dimensional shape, gap 46A is substantially eliminated, thereby causing the main electrodes lines 42 of x-axis electrode 22A-22G on electrode branches 44A and 44B to become adjacent to one another. This creates a substantially continuous touch-sensitive surface between electrode branches 44A and 44B.

Figure 7:
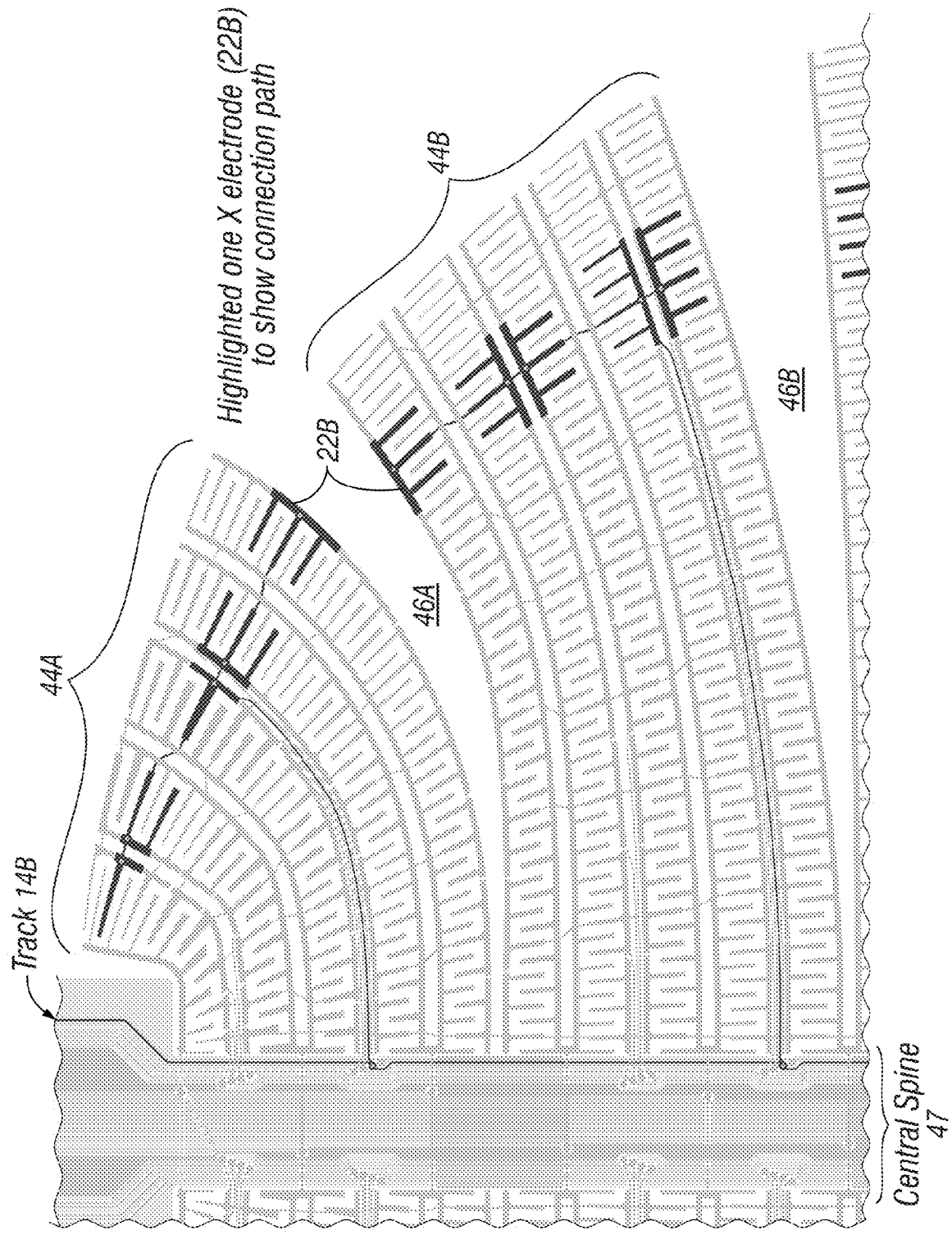
FIG. 7 illustrates a particular x-axis electrode of the touch sensor pattern of FIG. 4, according to example embodiments.

As discussed above, all corresponding x-axis electrodes 22 of electrode branches 44 are electrically coupled together in some embodiments and share a common track 14. For example, all corresponding x-axis electrodes 22B on electrode branches 44A-44D may be coupled to a common track 14B, as illustrated in FIG. 7. This effectively creates a single electrode that spans from the top of electrode branch 44A to the bottom of electrode branch 44D.

In order to connect the various portions of a particular x-axis electrode 22 on a particular electrode branch 44, some embodiments of touch sensor 40 may utilize one or more additional connection layers. For example, FIG. 9 illustrates an additional connection layer of touch sensor 40 for connecting the various portions of x-axis electrodes 22 together. The illustrated connection layer includes various connection lines 92 that electrically couple x-axis electrodes 22 together. For example, connection line 92A1 electrically couples x-axis electrodes 22A on electrode branch 44A together, connection line 92A2 electrically couples x-axis electrodes 22A on electrode branch 44B together, connection line 92A3 electrically couples x-axis electrodes 22A on electrode branch 44C together, and so forth. Similarly, connection line 92B1 electrically couples x-axis electrodes 22B on electrode branch 44A together, connection line 92B2 electrically couples x-axis electrodes 22B on electrode branch 44B together, connection line 92B3 electrically couples x-axis electrodes 22B on electrode branch 44C together, and so forth. While a particular pattern of connection lines 92 are illustrated in FIG. 9, other embodiments may utilize any appropriate pattern of connection lines 92.

FIGS. 10A and 10B illustrate touch sensor 40 that has been formed into an example three-dimensional shape. In this embodiment, the three-dimensional shape is a computer mouse. Touch sensor 40, when formed over the surface of the computer mouse, may allow a user to scroll, click, and perform other functions typically associated with a computer mouse. However, touch sensor 40 detects these typical movements of a user's fingers using y-axis electrodes 21 and x-axis electrodes 22. Notably, electrode branch 44I may detect movements from a user's thumb, and central spine 47, which is not touch-sensitive, is located under the palm of the user's hand—a portion of the user's hand that is not typically used for user input on a computer mouse.

As illustrated in FIGS. 10A and 10B, gaps 46 that previously existed when touch sensor 40 was flat (i.e., not formed into the three-dimensional shape, FIGS. 4A-6) have been substantially eliminated. As a result, adjacent electrode branches 44 that were previously separate by a gap 46 (e.g., electrode branches 44A and 44B) are sufficiently close to one another to allow y-axis electrodes 21 and x-axis electrodes 22 to detect any touches in any space between the electrode branches 44. This allows touch sensor 40 to detect touches by any touch object 28 (e.g., a user's finger) on substantially all of the surface of the computer mouse.

As described in detail above, y-axis electrodes 21 are drive electrodes and x-axis electrodes 22 are sense electrodes in some embodiments. In other embodiments, y-axis electrodes 21 are sense electrodes and x-axis electrodes 22 are drive electrodes. The disclosure anticipates electrodes 21 and 22 being any suitable combination of drive and sense electrodes. In addition, while a certain number of electrode teeth 43 are illustrated in the figures, the disclosure anticipates any suitable number and density of electrode teeth 43. Furthermore, while particular patterns of y-axis electrodes 21 and x-axis electrodes 22 have been illustrated, these electrodes may be formed of any appropriate pattern or shape.

As used herein, a substantially continuous touch-sensitive surface may be any surface in which electrodes are arranged sufficiently close to one another in order to detect touches from a touch object 28. For example, touch sensor 40, when formed into the three-dimensional shape as illustrated in FIGS. 10A and 10B, provides a substantially continuous touch-sensitive surface with y-axis electrodes 21 and x-axis electrodes 22. When formed into the illustrated shape, gaps 46 are substantially eliminated (i.e., adjacent electrode branches 44 are sufficiently close to one another to allow y-axis electrodes 21 and x-axis electrodes 22 to detect any touches in any space between the electrode branches 44), thereby allowing y-axis electrodes 21 and x-axis electrodes 22 to detect touches by any touch object 28 on substantially all of the surface of the shape. The only portions of the shape that will not be sensitive to touch will be those areas not covered by any electrodes (e.g., central spine 47 and connector 48).

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising:
    a flexible substrate;
    a plurality of sense electrodes and a plurality of drive electrodes disposed on the flexible substrate, each of the plurality of sense electrodes and the plurality of drive electrodes comprising a plurality of electrode teeth, wherein electrode teeth of the sense electrodes are interdigitated with electrode teeth of the drive electrodes;

a plurality of electrode branches, each particular electrode branch comprising a portion of at least one of the drive electrodes and a portion of at least one of the sense electrodes; and a central spine comprising a plurality of tracks coupled to the plurality of sense and drive electrodes;

wherein:
the plurality of electrode branches comprises:
a plurality of first electrode branches located on a first side of the central spine; and
a plurality of second electrode branches located on a second side of the central spine that is opposite to the first side;
when the touch sensor is not formed into a three-dimensional shape, at least a portion of one of the electrode branches is separated from an adjacent electrode branch by a gap; and
when the touch sensor is formed into the three-dimensional shape, the gap is substantially eliminated, thereby forming a substantially continuous touch-sensitive surface.

2. The touch sensor of claim 1, wherein the flexible substrate comprises:
polyimide;
polyethylene terephthalate (PET) with indium tin oxide (ITO); or
FR4.

3. The touch sensor of claim 1, wherein the plurality of drive and sense electrodes are formed on a single layer on the flexible substrate.

4. The touch sensor of claim 3, further comprising a coverlay disposed on top of the single layer.

5. The touch sensor of claim 1, wherein:
the plurality of drive electrodes comprises a first drive electrode and a second drive electrode;
the first drive electrode is located in a particular one of the plurality of first electrode branches on the first side of the central spine;
the second drive electrode is located in a particular one of the plurality of second electrode branches on the second side of the central spine that is opposite to the first side;
the first drive electrode and the second drive electrode are adjacent to each other across the central spine and are both coupled to a common track of the central spine.

6. A touch sensor comprising:
a flexible substrate;
a plurality of sense electrodes and a plurality of drive electrodes disposed on the flexible substrate, wherein a portion of each of the plurality of sense electrodes is interleaved with a least a portion of one of the plurality of drive electrodes; and
a plurality of electrode branches, each particular electrode branch comprising a portion of at least one of the drive electrodes and a portion of at least one of the sense electrodes;
wherein:
the plurality of electrode branches comprises:
a plurality of first electrode branches located on a first side of a central spine; and
a plurality of second electrode branches located on a second side of the central spine that is opposite to the first side;
when the touch sensor is not formed into a three-dimensional shape, at least a portion of one of the electrode branches is separated from an adjacent electrode branch by a gap; and
when the touch sensor is formed into the three-dimensional shape, the gap is substantially eliminated, thereby forming a substantially continuous touch-sensitive surface.

7. The touch sensor of claim 6, wherein the central spine comprises a plurality of tracks coupled to the plurality of sense and drive electrodes.

8. The touch sensor of claim 7, further comprising a connector coupled to the tracks of the central spine.

9. The touch sensor of claim 6, wherein
the plurality of sense electrodes and the plurality of drive electrodes comprise electrode teeth; and
electrode teeth of the sense electrodes are interdigitated with electrode teeth of the drive electrodes.

10. The touch sensor of claim 6, wherein the flexible substrate comprises:
polyimide;
polyethylene terephthalate (PET) with indium tin oxide (ITO); or
FR4.

11. The touch sensor of claim 6, wherein the plurality of drive and sense electrodes are formed on a first layer on the flexible substrate.

12. The touch sensor of claim 11, further comprising a coverlay disposed on top of the first layer.

13. The touch sensor of claim 11, further comprising a second layer disposed on an opposite side of the flexible substrate from the first layer, the second layer comprising a plurality of electrode connections.

14. A device comprising:
a touch sensor comprising:
a flexible substrate;
a plurality of sense electrodes and a plurality of drive electrodes disposed on the flexible substrate, wherein a portion of each of the plurality of sense electrodes is interleaved with a least a portion of one of the plurality of drive electrodes; and
a plurality of electrode branches, each particular electrode branch comprising a portion of at least one of the drive electrodes and a portion of at least one of the sense electrodes; and
one or more computer-readable non-transitory storage media embodying logic that is configured when executed to control the touch sensor;
wherein:
the plurality of electrode branches comprises:
a plurality of first electrode branches located on a first side of a central spine; and
a plurality of second electrode branches located on a second side of the central spine that is opposite to the first side;
when the touch sensor is not formed into a three-dimensional shape, at least a portion of one of the electrode branches is separated from an adjacent electrode branch by a gap; and
when the touch sensor is formed into the three-dimensional shape, the gap is substantially eliminated, thereby forming a substantially continuous touch-sensitive surface.

15. The device of claim 14, wherein the central spine comprises a plurality of tracks coupled to the plurality of sense and drive electrodes.

16. The device of claim 15, the touch sensor further comprising a connector coupled to the tracks of the central spine.

17. The device of claim 14, wherein:
   the plurality of sense electrodes and the plurality of drive electrodes comprise electrode teeth; and
   electrode teeth of the sense electrodes are interdigitated with electrode teeth of the drive electrodes.

18. The device of claim 14, wherein the plurality of drive and sense electrodes are formed on a first layer on the flexible substrate.

19. The device of claim 18, the touch sensor further comprising a coverlay disposed on top of the first layer.

20. The device of claim 18, the touch sensor further comprising a second layer disposed on an opposite side of the flexible substrate from the first layer, the second layer comprising a plurality of electrode connections.

* * * * *